US008464156B2

(12) United States Patent
Bagley et al.

(10) Patent No.: US 8,464,156 B2
(45) Date of Patent: Jun. 11, 2013

(54) INTERACTIVE PRODUCT CONFIGURATOR WITH DEFAULT DECISIONS

(75) Inventors: Claire M. Bagley, Carlisle, MA (US); Martin P. Plotkin, Concord, MA (US); Michael Colena, Lowell, MA (US)

(73) Assignee: Oracle International Corporation, Redwood Shores, CA (US)

( * ) Notice: Subject to any disclaimer, the term of this patent is extended or adjusted under 35 U.S.C. 154(b) by 797 days.

(21) Appl. No.: 12/188,525

(22) Filed: Aug. 8, 2008

(65) Prior Publication Data

US 2010/0037142 A1    Feb. 11, 2010

(51) Int. Cl.
*G06F 3/00* (2006.01)
*G06F 15/177* (2006.01)
*G06F 3/048* (2006.01)
*G06F 17/00* (2006.01)
*G06Q 30/00* (2012.01)

(52) U.S. Cl.
USPC ........... 715/733; 715/735; 715/810; 715/811; 715/812; 715/813; 705/26.5; 706/47

(58) Field of Classification Search
USPC ............. 715/733, 810–813; 705/26.5; 706/47
See application file for complete search history.

(56) References Cited

U.S. PATENT DOCUMENTS

| | | | | |
|---|---|---|---|---|
| 6,980,967 B1 * | 12/2005 | Mela | ............................... | 705/28 |
| 6,983,421 B1 * | 1/2006 | Lahti et al. | ..................... | 715/763 |
| 7,039,602 B1 * | 5/2006 | Kapadia et al. | .............. | 705/26.5 |
| 7,069,537 B2 | 6/2006 | Lazarov | | |
| 8,335,987 B2 * | 12/2012 | Bagley et al. | .................. | 715/735 |
| 2002/0087389 A1 * | 7/2002 | Sklarz et al. | ..................... | 705/10 |
| 2002/0107749 A1 | 8/2002 | Leslie et al. | | |
| 2002/0143653 A1 | 10/2002 | DiLena et al. | | |
| 2002/0165701 A1 * | 11/2002 | Lichtenberg et al. | ............. | 703/7 |
| 2005/0278271 A1 | 12/2005 | Anthony et al. | | |
| 2008/0222561 A1 * | 9/2008 | Helfman et al. | ............... | 715/810 |

OTHER PUBLICATIONS

Selectica, "Selectica Configuration", Solution Overview, 2005, Selectica, Inc., San Jose, CA.
ILOG, "ILOG Configurator, Powering online product and service configuration applications", Product Datasheet, Mar. 2005, ILOG.S.A.
Oracle, "Oracle Configurator", Oracle Data Sheet, 2008, Oracle.
Tacton, "Tacton's Sales Configurator—Bridging the gap between engineering and sales for selling customized products.", http://www.tacton.com/templates/page_68.aspx?epslanguage=EN, 2007, Tacton Systems AB, Sweden.

* cited by examiner

*Primary Examiner* — Weilun Lo
*Assistant Examiner* — Dino Kujundzic
(74) *Attorney, Agent, or Firm* — Miles & Stockbridge P.C.

(57) ABSTRACT

An interactive product configurator includes a constraint network having a plurality of nodes. The configurator receives a new user choice after previously asserting one or more default decisions. The configurator then retracts the previously asserted default decisions before asserting the new user choice. The default decisions are then reasserted.

13 Claims, 8 Drawing Sheets

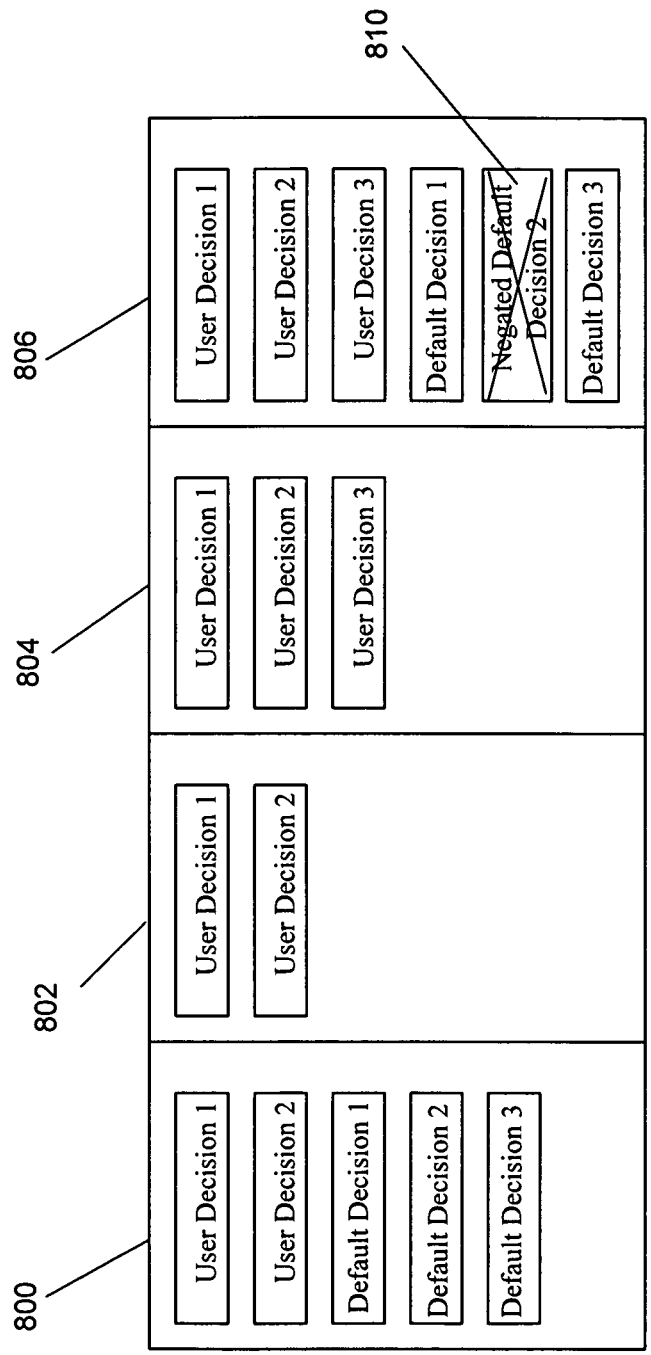

INTERACTIVE PRODUCT CONFIGURATOR WITH DEFAULT DECISIONS

FIELD OF THE INVENTION

One embodiment is directed generally to computer interaction, and in particular to an interactive product configurator.

BACKGROUND INFORMATION

Many current products and services can be customized by a customer before being purchased. For example, computer systems typically include many possible options and configurations that can be specifically selected or configured by the customer. Other examples of highly configurable products and services include telephone switching systems, airplanes, automobiles, mobile telephone services, insurance policies, and computer software.

Product and service providers typically provide a "product configurator" that allows a customer or sales engineer to interact with a computer in order to customize and configure a solution by selecting among optional choices. Some known product configurators are constraint-based. For these configurators, constraints are enforced between optional choices, allowing the user to select the choices they want, while validating that the resulting set of user choices is valid.

The user of an interactive configuration system may not know how to answer every question, or care about the selection of every option required to complete the configuration. The business providing the configurator to the end user may also want to suggest certain choices to the end user. For both of these reasons, it may be useful to present the user with "default decisions." A default decision may be a simple choice (i.e., a value that is assigned to some node in the constraint network) or it may be a more complex constraint involving one or more nodes as operands. In the known constraint-based configurators, a default decision is processed after all user decisions have been made, as part of a heuristic search. However, this does not allow the user to see the default decisions or their consequences while making their own decisions. Further, if the user wants to change the default decisions at that point, it is typically necessary to undo the entire search, revise the user decisions, and re-run the search.

SUMMARY OF THE INVENTION

One embodiment is an interactive product configurator that includes a constraint network having a plurality of nodes. The configurator receives a new user choice after previously asserting one or more default decisions. The configurator then retracts the previously asserted default decisions before asserting the new user choice. The default decisions are then reasserted.

BRIEF DESCRIPTION OF THE DRAWINGS

FIG. 8 graphically illustrates the functionality of FIG. 7 when backtracking out prior asserted default decisions and adding a new user choice.

DETAILED DESCRIPTION

One embodiment is an interactive product configurator that allows a user to define default selections and a priority sequence among default decisions. Further, embodiments can negate or retract default decisions that create a conflict so that the user does not again encounter the same conflict as the user continues to interact with the product configurator.

Figure 1:
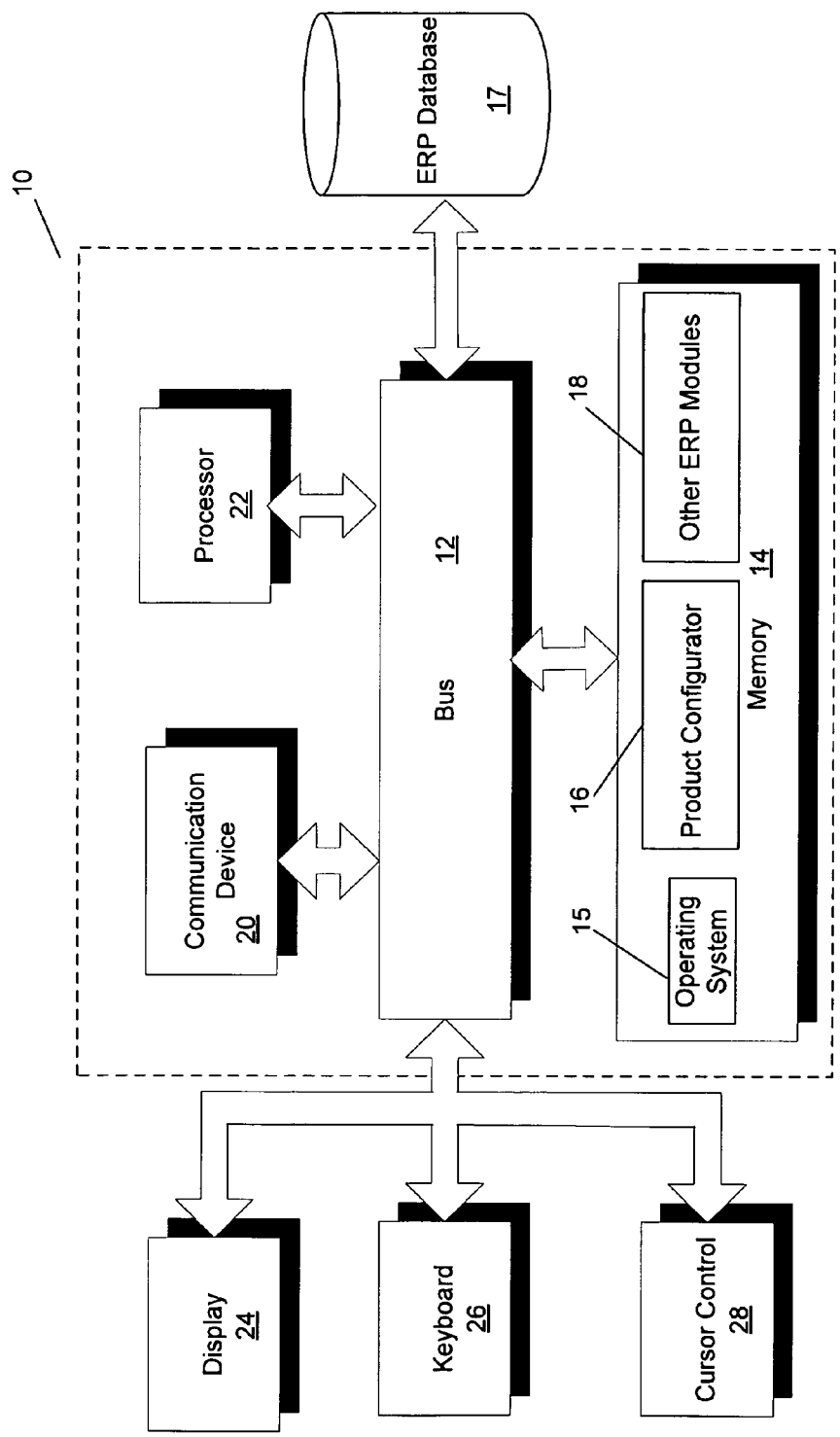
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product configurator 16 that performs interactive product configuration as disclosed in more detail below. The modules further include other enterprise resource planning ("ERP") modules 18 of an ERP system that may interact with product configurator 16, such as a bill of material ("BOM") module and a customer relationship manager ("CRM") module. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, product configurator 16 may be a stand-alone system and not integrated with an ERP system, or may be part of any other integrated system.

In one embodiment, product configurator 16 allows a user to interactively configure a product or service by choosing options. Product configurator 16 in one embodiment is constraint-based in that it solves a constraint problem to arrive at a solution (i.e., an appropriate and valid configuration). A constraint problem is a problem with a given set of variables, a given set of values or range of values (referred to as a "domain") for each variable, and a given set of constraints. Each constraint restricts the values, from the set of values, that may be simultaneously assigned to each variable of the set of variables. The solution is a combination of assignments of values to each variable that is consistent with all constraints.

A configuration "model" is created in order to implement a configurator. A model represents a generic framework of a solution, or of many possible solutions, to a problem, and includes a classification of associated model entities. The model entities are referred to as "nodes" and represent the domains of the constraint based system. A model may represent an apparatus, such as an automobile, with various option packages; a system such as a telecommunications network, with various hardware, software, protocol and service options; a suite of available services; a suite of software applications, etc. A constraint network is a series of nodes linked by constraints.

When a model is created and executed by product configurator 16, a user can interact with the model. The interaction in general involves the user being presented with a series of choices or items. Each item is represented by a variable in the underlying constraint system. Each variable has a domain, which is a range or set of possible values (e.g., integers between 0 and 10, the set of blue, red or green, etc.). As choices are made by the user, the domain may shrink. For example, if the configurator is for a car, the user may choose a sedan instead of a convertible. However, in the next choice, which is the color of the car, red may no longer be available because a sedan cannot be configured in red. If a user backtracks and decides not to choose a sedan, the color red should be restored as one of the color choices. In prior art configurator systems, a restart is typically required to restore the color red. In contrast, in one embodiment, the change of domains is efficiently tracked and stored so changes as a result of backtracking or other reasons can easily be undone.

Figure 2:
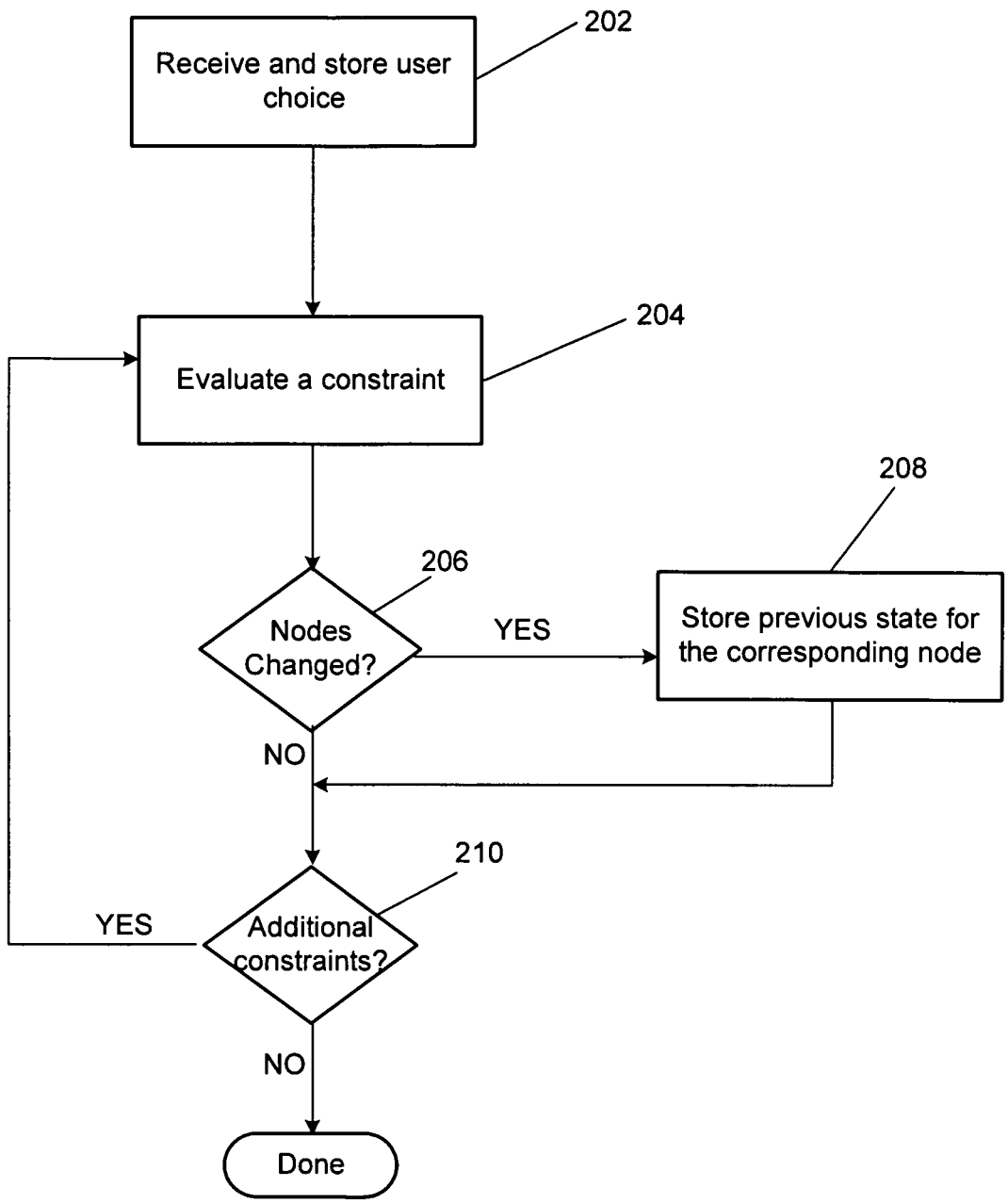
FIG. 2 is a flow diagram of the functionality of a product configurator when a user makes a choice when interacting with a configurator model in accordance with one embodiment.

FIG. 2 is a flow diagram of the functionality of product configurator 16 when a user makes a choice when interacting with a configurator model in accordance with one embodiment. In one embodiment, a user choice is any representation of an action by the user in the configurator user interface ("UI"). Examples of a user choice include clicking a checkbox, entering a number in a box, choosing a number or choice within a drop down box, etc. The user choices are added and managed in a manner that allows for efficient backtracking and/or negation. In one embodiment, the functionality of the flow diagram of FIG. 2, and FIGS. 6 and 7 below, is implemented by software stored in memory or other computer readable or tangible medium, and executed by a processor. In other embodiments, the functionality can be performed by hardware, or any combination of hardware and software.

At 202, the user choice is received and stored. The user choice can be stored using any type of internal representation of the choice and in one embodiment is stored in memory 14. The user choice at 202 may cause one or more associated outward constraints in the constraint network to be affected (i.e., due to the propagation of the user choice throughout the constraint network), which may modify the associated node for each constraint.

At 204, the first/next outward constraint affected by the user choice at 202 is evaluated.

At 206, it is determined if the node for the constraint has changed. If so, at 208 the previous state for the node is stored and associated with the added user choice at 202.

At 210, if the node for the constraint has not changed, or after storing the previous state at 208, it is determined if there are additional constraints to evaluate from the user choice. If there are, the flow returns to 204. In this manner, the propagation of the entire constraint network as a result of the user choice 202 is evaluated and previous state of any nodes that have changed in response to the user choice is saved.

When the functionality of FIG. 2 is complete, for each node affected by propagation in the constraint network, the prior domain state is recorded and is associated with the current choice. In one embodiment, the functionality of FIG. 2 is executed for every new user choice and for all other decisions, including default decisions.

Figure 3:
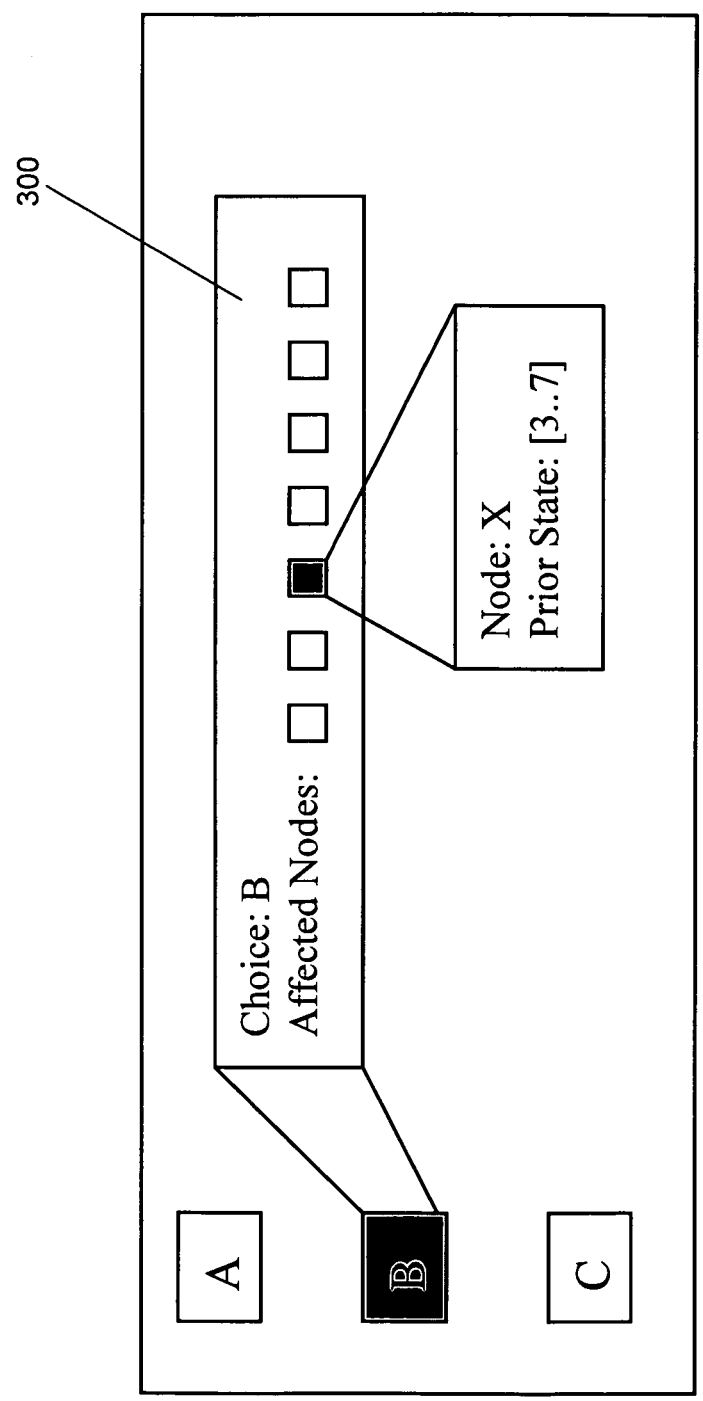
FIG. 3 graphically illustrates a result of the functionality of FIG. 2 when a user choice is received in accordance with one embodiment.

FIG. 3 graphically illustrates a result of the functionality of FIG. 2 when a user choice is received in accordance with one embodiment. As shown in the example of FIG. 3, a user has made a choice A, followed by choice B, followed by choice C. Each choice contains a set of affected nodes in the constraint network. For choice B, the affected nodes are shown in box 300. As shown, one of the affected nodes for choice B, node X, has a prior state of a numerical range of 3-7. This prior state is what is recorded at 208 of FIG. 2. Because for each user choice the prior state of each affected node is stored, embodiments of the present invention can efficiently remove prior user choices (i.e., backtracking by the user) without requiring a restart of the system.

In one embodiment, a user of system 10 who is creating a constraint model can set up a series of rules and designate each rule as a "default rule" or "default constraint" (also referred to as a "soft constraint") or a "constraint" rule (also referred to as a "hard constraint"). In general, a constraint must be satisfied by the constraint model solution, while a default decision is preferred to be satisfied, but does not necessarily have to be satisfied when arriving at a viable solution. In one embodiment, the constraint used as the default decision can be any type of constraint, including selections of options or assignment of values or much more complex constraints. Default decisions may be used by a business that is operating system 10 to guide the user to the business's preferred solution.

Figure 4:
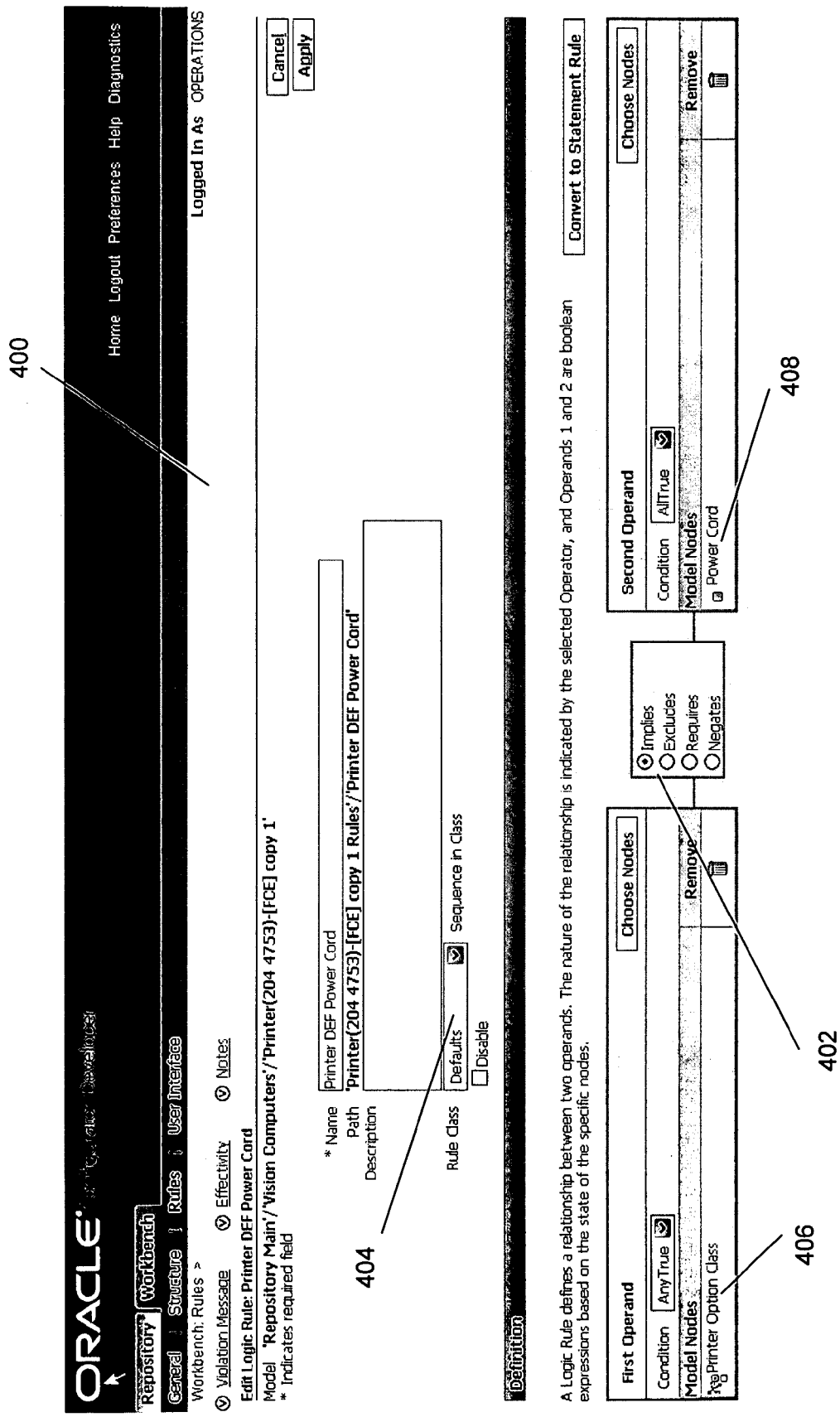
FIG. 4 is a user interface in accordance with one embodiment that allows a modeler of the constraint model to define default or constraint logic rules between two nodes using Boolean operands.

FIG. 4 is a user interface ("UI") 400 in accordance with one embodiment that allows a modeler of the constraint model to define default or constraint logic rules between two nodes using Boolean operands. In the "definition" section 402, the nodes are selected and the rule is defined using the Boolean operands. In the example of FIG. 4, a selection of a printer node at 406 implies a selection of a power cord node at 408. Drop down box 404 allows the user to designate the rule defined in definition section 402 as either a "default" rule (as shown in the example of FIG. 4) or as a "constraint" rule. In operation, when an end user is interacting with product configurator 16, the end user may choose the printer at 406 and the configurator will automatically select the power cord at 408. However, because this is a default rule, the user can override the power cord selection (i.e., remove the power cord from the configuration). Although the example in FIG. 4 shows a default rule using Boolean operands, the default rule can also be based on numeric logic. For example, the default rule could be a numeric computation (Discounted Price=Total Price*0.95) or comparison (Total Slots>=Number of cards). In other embodiments, any type of operands that participate in the constraint network may be used to form the default rules.

Figure 5:
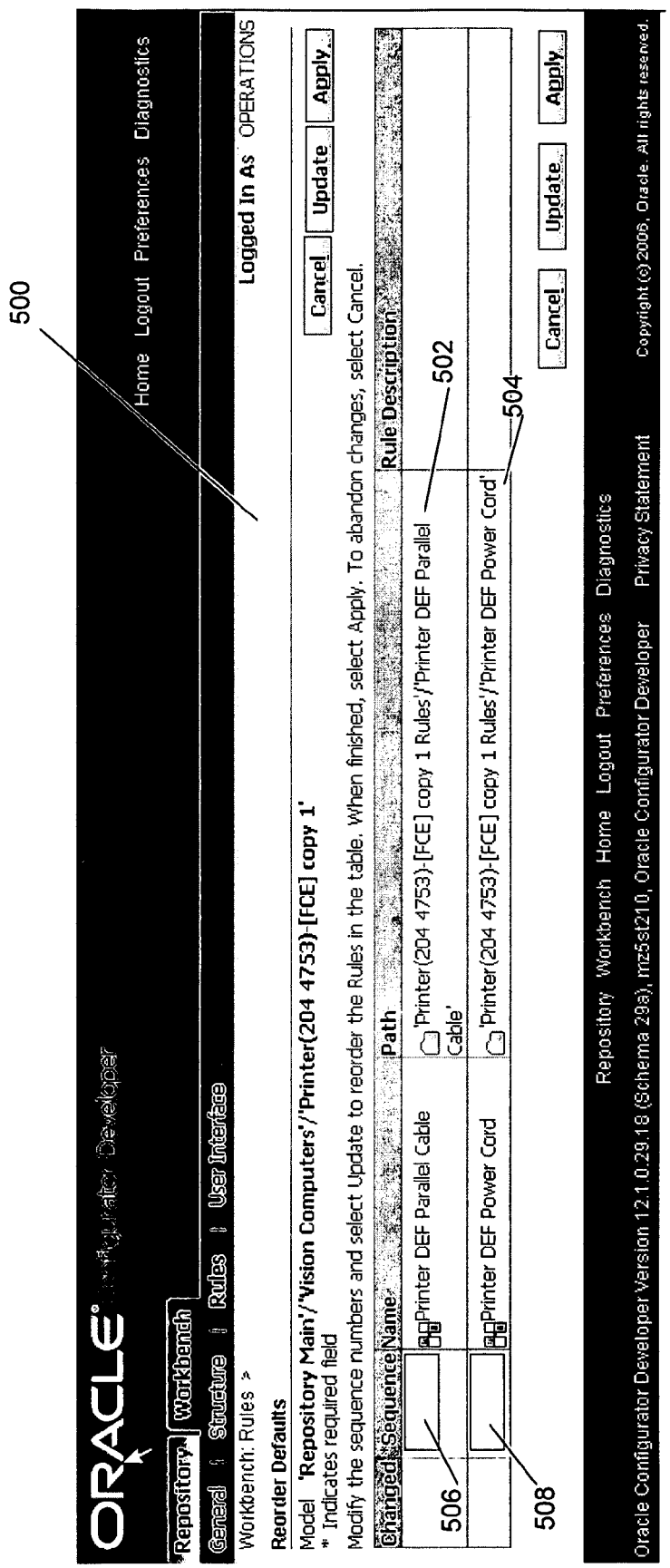
FIG. 5 is a user interface in accordance with one embodiment that allows a modeler of a constraint model to arrange default rules/decisions in a priority sequence.

FIG. 5 is a UI 500 in accordance with one embodiment that allows a modeler of a constraint model to arrange default rules/decisions in a priority sequence. This allows the modeler to predict which default decisions will succeed depending on the end user's decisions, and allows the modeler to guide the user in a desired direction. In the example of FIG. 5, two default rules/decisions in response to a selection of a printer are displayed: a printer parallel cable 502 and a printer power cord 504. UI 500 includes sequence boxes 506 and 508 that allows the modeler to specify an order of the default rules by, for example, inserting a "1" in one box and a "2" in the other box. By changing the order of the default rules, the modeler can tailor the outcome of the propagation of the rules and designate which rule is most important.

Figure 6:
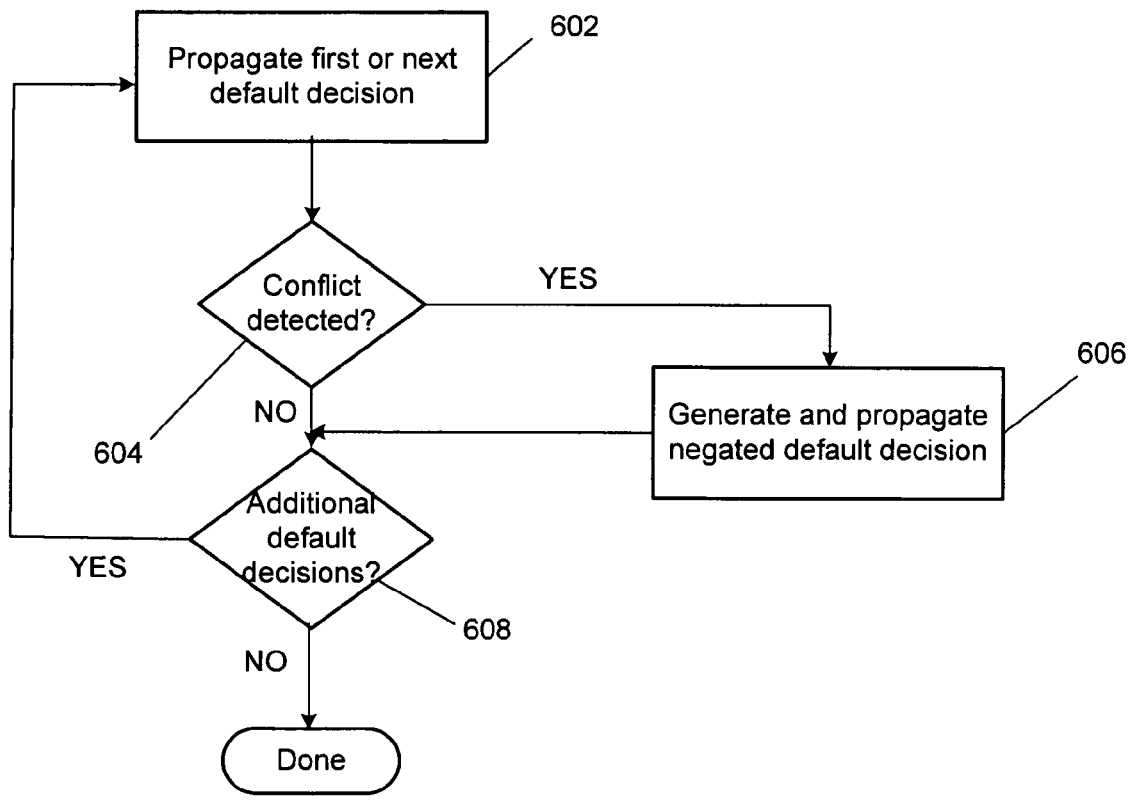
FIG. 6 is a flow diagram of the functionality of the product configurator when a default rule is selected and propagated through the constraint network in accordance with one embodiment.

FIG. 6 is a flow diagram of the functionality of product configurator 16 when a default decision/rule is selected and propagated through the constraint network in accordance with one embodiment. When a user makes a choice while interacting with product configurator 16, a list of one or more default decisions that were defined, for example, at UI 400 of FIG. 4, may be generated. Some of these default decisions may have precedence over other default decisions, as defined at UI 500 of FIG. 5. At 602, the first (if 602 is being executed for the first time) or the next default decision on the list of all default decisions is propagated throughout the constraint network. Propagating the default decision includes determining the impact of all nodes in the network that are tied into the default decision through constraints.

At 604, for the default decision that is propagated at 602, it is determined if it leads to a conflict with one or more nodes. If there is not a conflict at 604, then at 608 it is determined if there are additional default decisions on the list. If so, the functionality returns to 602 and the next default decision on the list is propagated. If there are no more default decisions, the functionality is finished.

If it is determined that there is a conflict at 604, then at 606 a negated default decision is generated and propagated. A negated default decision is a negation of the default decision that caused the conflict. For example, if the default decision is that a selection of a printer will require a parallel cable, the negated default decision is that the selection of the printer cannot include the parallel cable. The generation and propagation of the negated default decision throughout the constraint network prevents the user from again encountering the same conflict at 604 as the user continues to interact with product configurator 16.

The functionality of FIG. 6 is executed while the user is interacting with product configurator 16. If a default decision is inconsistent with the user's decisions or with prior applied default decisions, product configurator 16 enforces the negation of the default decision, which improves performance and user feedback by reducing the solution space.

In one embodiment, in order to provide interactive feedback to the user regarding default decisions and their consequences, product configurator 16 enforces the default decisions initially and after every user choice. Then, in order to avoid conflicts between the default decisions and subsequent user choices, product configurator 16 retracts or backtracks the default decisions prior to propagating a new user choice. The retraction is done in an efficient manner to ensure that the repetitive retraction does not negatively impact performance.

Figure 7:
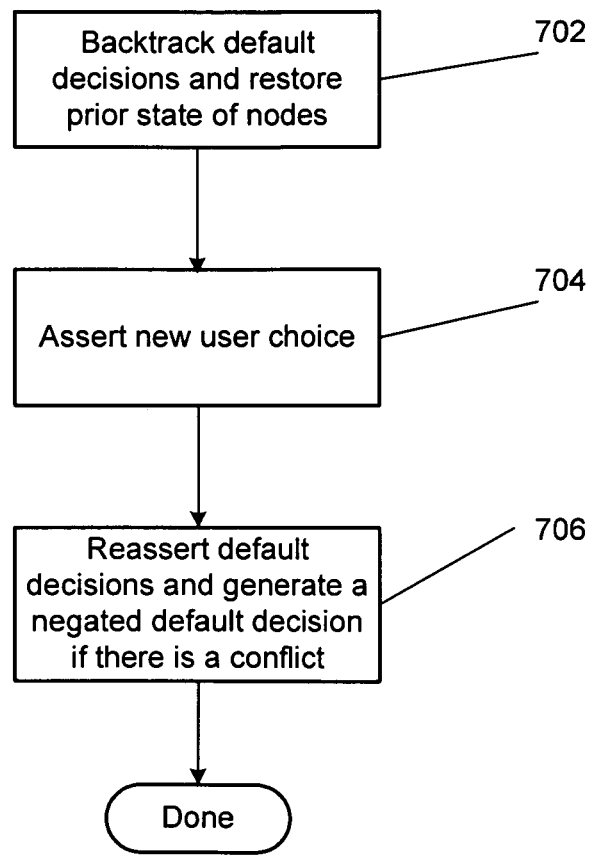
FIG. 7 is a flow diagram of the functionality of the product configurator when a default decision is backtracked out before a user choice in accordance with one embodiment.

FIG. 7 is a flow diagram of the functionality of product configurator 16 when a default decision is backtracked out before a user choice in accordance with one embodiment. At 702, after a new user choice is received but before it is propagated, all default decisions are backtracked. When backtracking each default decision, the prior state of each node that was affected when the default decision was asserted is restored. The prior state of each node had previously been stored and is available in one embodiment because the functionality of FIG. 2 was executed whenever a new user choice or a default decision was asserted and propagated.

At 704, the new user choice is asserted and propagated.

At 706, the default decisions that were removed or backtracked at 702 are reasserted. If a default decision that is reasserted at 706 creates a conflict, that default decision will be dropped and a negated default decision will be generated and propagated in accordance with the functionality of FIG. 6. Therefore, the functionality of FIG. 7 will insure that a user choice will always have precedence over a default decision.

FIG. 8 graphically illustrates the functionality of FIG. 7 when backtracking out prior asserted default decisions and adding a new user choice. At 800, five choices have been asserted—two user decision choices and three default decisions that were asserted based on default rules. At this point, a user makes a new choice ("User Decision 3").

At 802, the three default decisions are retracted/backtracked per 702 of FIG. 7.

At 804, the new user choice is asserted per 704 of FIG. 7.

At 806, default choices 1-3 are reasserted per 706 of FIG. 7. In the example of FIG. 8, default decision 2 upon being reasserted generates a conflict. Therefore, a negated default decision 2 (shown at 810) is instead generated and propagated.

As disclosed, embodiments of the configurator provide default decisions so that default selections and their consequences are visible to the interactive user and do not impede the user's ability to make different choices if they so desire. Further, the presence of default selections do not degrade the performance of processing the user's selections. Embodiments provide the ability for the modeler to define default decisions to be taken on behalf of the end user unless they conflict with actual user input and/or model constraints. This is achieved by assigning a lower precedence to default decisions than to user choices.

Further, in order to provide interactive feedback to the end user about the default decisions and their consequences, the embodiments enforce the default decisions initially and after every user decision. Then, in order to avoid conflicts between the default decisions and subsequent user choices, embodiments retract the default decisions prior to each user decision in an efficient manner.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-implemented method of operating a product configurator that comprises a constraint network having a plurality of nodes, the method comprising:

receiving a first user choice during an interactive configuration session with the product configurator;

retracting one or more default decisions, wherein the default decisions were automatically asserted by the product configurator before receiving the first user choice and wherein a retracting of a default decision comprises restoring a prior state of one or more affected nodes that were changed when the default decision was asserted and propagated through the constraint network;
asserting the first user choice after retracting the default decisions;
reasserting the default decisions after asserting the first user choice;
for each default decision being reasserted, determining if there is a conflict in the constraint network; and
if there is the conflict, generating and propagating a negated default decision instead of the default decision, wherein the negated default decision is a constraint that is a negation of the corresponding default decision that caused the conflict and prevents the corresponding default decision from being propagated during the interactive configuration session;
wherein asserting the first user choice comprises determining one or more affected nodes of the plurality of nodes that are changed by the first user choice propagating through the constraint network; and
for each affected node, storing a first prior domain state of the node and associating the first stored prior domain state with the first user choice.

2. The method of claim 1, further comprising:
asserting a first default decision;
determining one or more affected nodes of the plurality of nodes that are changed by the first default decision propagated through the constraint network;
for each affected node, storing a prior domain state of the node and associating the stored prior domain state with the first default decision.

3. The method of claim 1, wherein the default decisions comprise Boolean operands.

4. The method of claim 1, wherein the default decisions comprise numeric operands.

5. The method of claim 3, wherein the default decisions are received via a user interface that includes an option of defining a decision as a rule or a constraint.

6. The method of claim 1, further comprising:
assigning an order of priority to the default decisions.

7. A non-transitory computer readable medium having instructions stored thereon that, when executed by a processor, causes the processor to function as an interactive product configurator, the configurator comprising:
receiving a first user choice during an interactive configuration session with the product configurator;
retracting one or more default decisions, wherein the default decisions were automatically asserted by the product configurator before receiving the first user choice and wherein a retracting of a default decision comprises restoring a prior state of one or more affected nodes that were changed when the default decision was asserted and propagated through the constraint network;
asserting the first user choice after retracting the default decisions; and
reasserting the default decisions after asserting the first user choice;
for each default decision being reasserted, determining if there is a conflict in the constraint network; and
if there is the conflict, generating and propagating a negated default decision instead of the default decision, wherein the negated default decision is a constraint that is a negation of the corresponding default decision that caused the conflict and prevents the corresponding default decision from being propagated during the interactive configuration session;
wherein asserting the first user choice comprises determining one or more affected nodes of the plurality of nodes that are changed by the first user choice propagating through the constraint network; and
for each affected node, storing a first prior domain state of the node and associating the first stored prior domain state with the first user choice.

8. The computer readable medium of claim 7, wherein the default decisions comprise Boolean operands.

9. The computer readable medium of claim 8, wherein the default decisions are received via a user interface that includes an option of defining a decision as a rule or a constraint.

10. The computer readable medium of claim 7, wherein the default decisions comprise numeric operands.

11. The computer readable medium of claim 7, further comprising:
assigning an order of priority to the default decisions.

12. A product configurator that comprises a constraint network having a plurality of nodes, the product configurator comprising:
a processor;
a non-transitory computer readable medium coupled to the processor and storing instructions that when executed by the processor comprises:
receiving a first user choice during an interactive configuration session with the product configurator;
retracting one or more default decisions, wherein the default decisions were automatically asserted by the product configurator before receiving the first user choice and wherein a retracting of a default decision comprises restoring a prior state of one or more affected nodes that were changed when the default decision was asserted and propagated through the constraint network;
asserting the first user choice after retracting the default decisions;
reasserting the default decisions after asserting the first user choice;
for each default decision being reasserted, determining if there is a conflict in the constraint network; and
if there is the conflict, generating and propagating a negated default decision instead of the default decision, wherein the negated default decision is a constraint that is a negation of the corresponding default decision that caused the conflict and prevents the corresponding default decision from being propagated during the interactive configuration session;
wherein asserting the first user choice comprises determining one or more affected nodes of the plurality of nodes that are changed by the first user choice propagating through the constraint network; and
for each affected node, storing a first prior domain state of the node and associating the first stored prior domain state with the first user choice.

13. The product configurator of claim 12, further comprising:
assigning an order of priority to the default decisions.

* * * * *